Feb. 21, 1939. L. F. SCHAU 2,147,992
UNLOADER
Filed Aug. 11, 1938 2 Sheets-Sheet 2

Inventor
Louie F. Schau

By Clarence A. O'Brien
and Hyman Berman
Attorneys

Patented Feb. 21, 1939

2,147,992

UNITED STATES PATENT OFFICE 2,147,992

UNLOADER

Louie F. Schau, Battle Creek, Iowa, assignor of one-half to Peter E. Schau, Battle Creek, Iowa Application August 11, 1938, Serial No. 224,366

1 Claim. (Cl. 214—83)

This invention appertains to new and useful improvements in unloaders and more especially to grain unloaders for various kinds of grain vehicles.

An important object of the present invention is to provide an unloader which will require very limited space and which in operation will be of quick action yet not susceptible to the ready development of defects.

Other objects and advantages of the invention will become apparent to the reader of the following specification.

In the drawings:—

Figure 1:
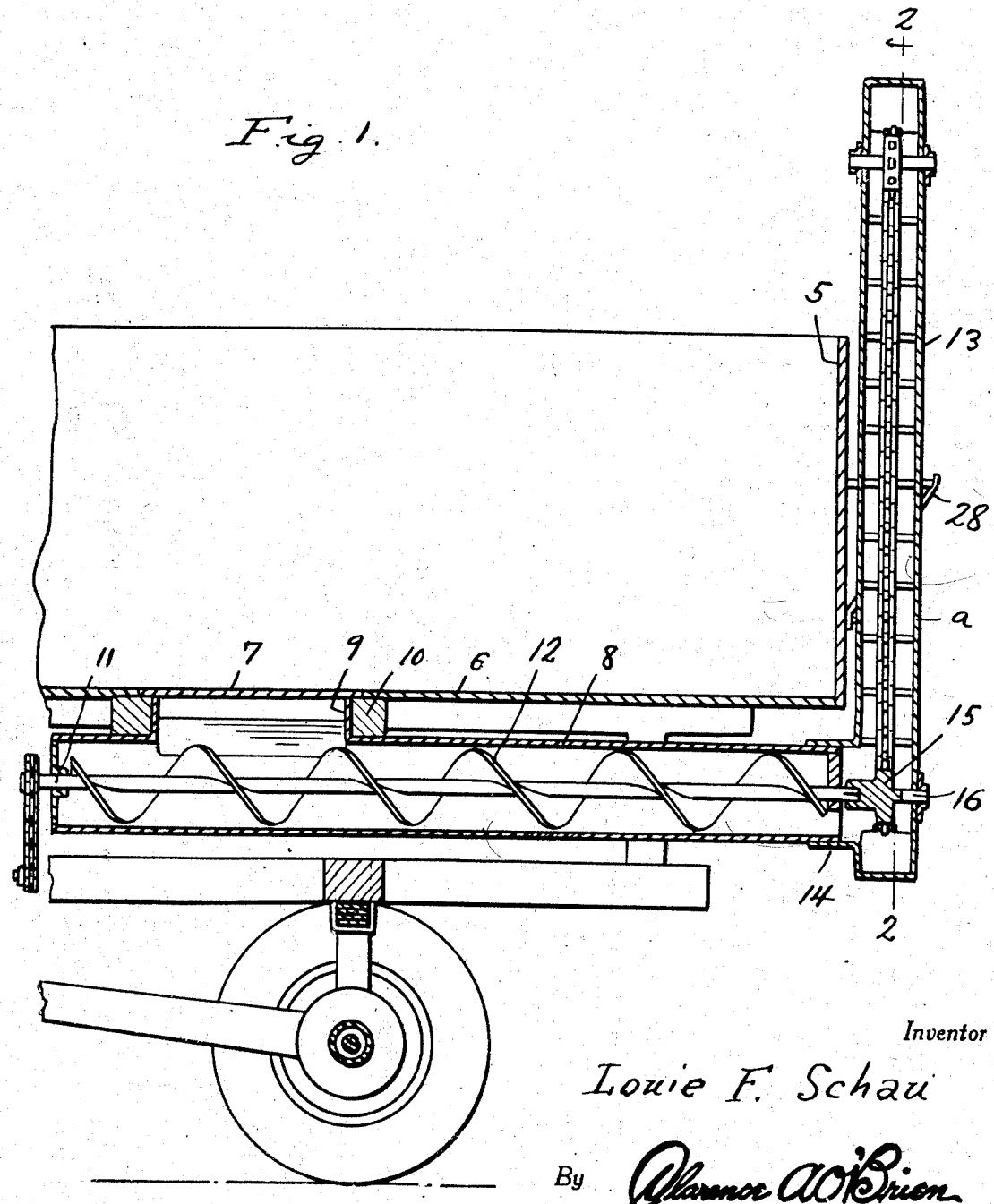
Figure 1 represents a fragmentary vertical sectional view through the vehicle and unloader.
Figure 2:
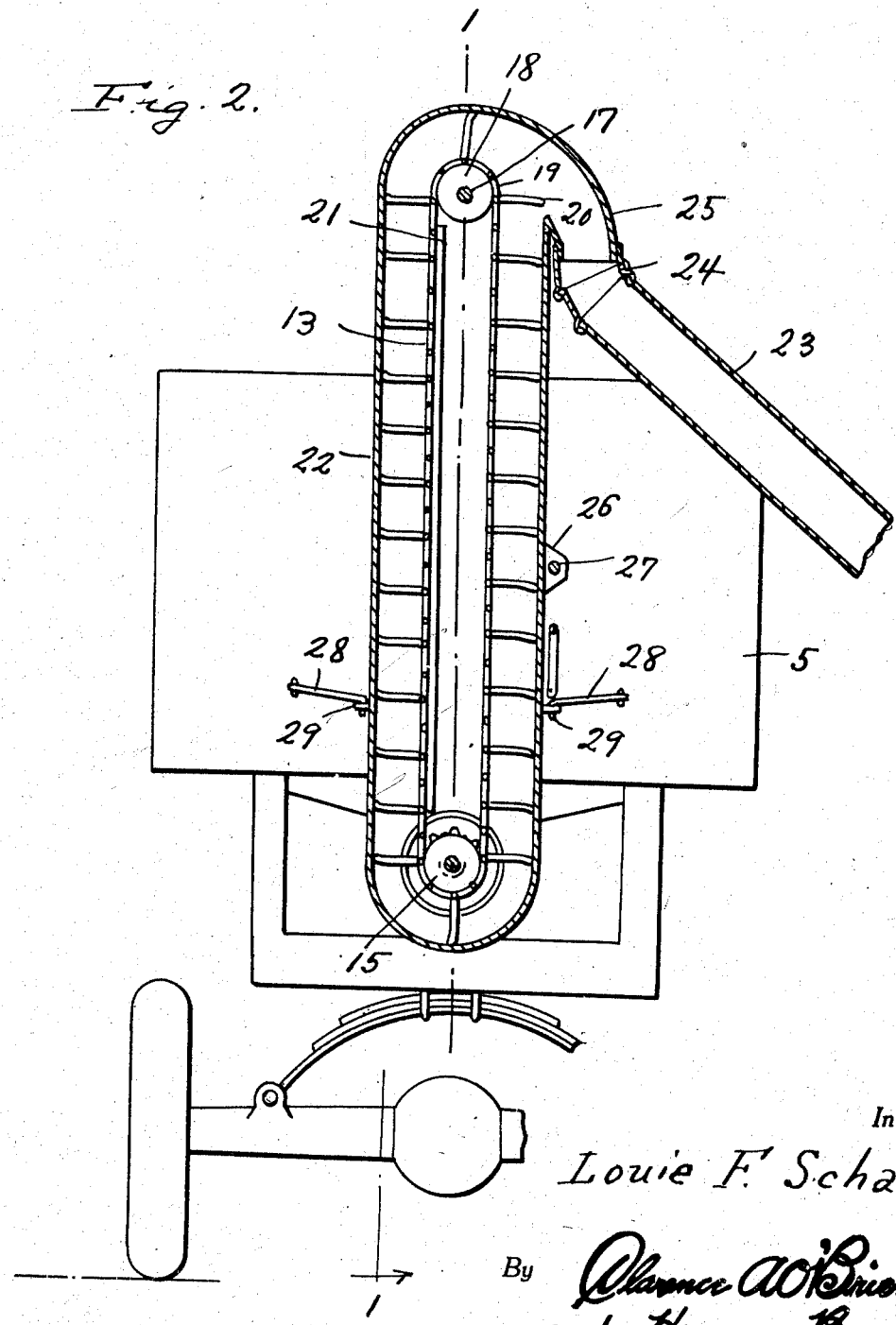
Figure 2 is a fragmentary vertical transverse sectional view through the unloader.

Referring to the drawings wherein like numerals designate like parts, it can be seen that numeral 5 represents the grain box of the vehicle which includes the bottom 6, having the removable closure 7. Numeral 8 denotes the conduit which underlies the bottom 6 and which is provided with a short upstanding spout 9 disposed into the wall structure 10 which underlies the bottom 6 at the aforementioned discharge opening.

The forward end of the conduit 8 is closed and through this extends the shaft 11 which carries the feed screw 12.

Numeral 13 represents the vertical chute which is provided with a horizontally disposed annular wall 14 embracing the rear end of the conduit 8 for receiving grain discharged from the conduit 8 by the screw 12.

The rear end of the shaft 11 operates the sprocket wheel 15 which has the pintle extension 16 operating through the back wall a of the chute 13. A shaft 17 extends horizontally through the upper portion of the chute 13 and carries the sprocket wheel 18. Over these sprocket wheels 15 and 18 is trained the endless sprocket chain 19 which carries the lifting plates 20 for the grain.

These lifting plates are of a size which will barely pass vertically between the front and rear walls of the chute 13 and between the vertical partition 21 and the side wall 22.

A spout 23 suitably connected as at 24 to the off chute 25 serves to deliver grain to a point of deposit.

Ear members 26 are provided on the side wall of the chute 13 and through this is disposed the arm or bracket member 27 for supporting the chute and a suitable detent 28 (see Figure 1) may be used in conjunction therewith.

To keep the chute 13 against the back of the box 5, hook members 28—28 swingably connected to the box 5 can be hooked over eyes 29 on the chute 13. Obviously, the chute 13 can be easily disconnected from the box and from the conduit 8 and can be used only (if desired) when grain is to be unloaded from the vehicle.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

A grain vehicle comprising a grain container having a discharge opening in the bottom thereof, a conduit underlying the container and being in communication with the interior of the container by way of the discharge opening, feed means in the conduit, an elevator at the rear of the container, said elevator including a casing, detachable connecting means between the container and the casing, the lower portion of the elevator casing being provided with a sleeve-like extension for slip connection with the adjacent end of the conduit, and detachable coupling means between the feed means and the conduit and the lower portion of the said elevator.

LOUIE F. SCHAU.